United States Patent [19]

Skeist

[11] 4,248,162
[45] Feb. 3, 1981

[54] TABLE WITH ELECTROSTATIC AIR PURIFIER/CLEANER

[75] Inventor: S. Merrill Skeist, Glenhead, N.Y.

[73] Assignee: Spellman High Voltage Electronics Corporation, Plainview, N.Y.

[21] Appl. No.: 60,895

[22] Filed: Jul. 26, 1979

[51] Int. Cl.³ .................. A47B 13/16; A47B 37/00; F24F 3/16

[52] U.S. Cl. .................. 108/50; 108/161; 98/33 A; 55/128; 55/385 R

[58] Field of Search .................. 55/101, 128, 385 R, 55/385 A, 385 C, DIG. 18, DIG. 29; 108/50, 161; 98/33 A

[56] References Cited

U.S. PATENT DOCUMENTS

| | | | |
|---|---|---|---|
| 2,347,334 | 4/1944 | Schmieg | 55/DIG. 18 |
| 3,498,032 | 3/1970 | Scott | 55/DIG. 18 |
| 3,880,061 | 4/1975 | Hensiek et al. | 55/DIG. 29 |
| 3,895,570 | 7/1975 | Eagleson, Jr. | 55/DIG. 18 |
| 4,140,498 | 2/1979 | Krause | 55/385 A |

Primary Examiner—David L. Lacey
Attorney, Agent, or Firm—Kenneth S. Goldfarb

[57] ABSTRACT

A table having a table top having a top surface. Grilles are provided in the table top and are in flow communication with an electrostatic precipitator for purifying the air. The electrostatic precipitator collects the smoke particles on a filter, the clean, filtered air being discharged at low velocity back into the room. This table equipped with air cleaner and filter prevents smoke generated by smokers and in ashtrays from diffusing throughout the room by capturing the smoke close to the source of the impurities.

7 Claims, 5 Drawing Figures

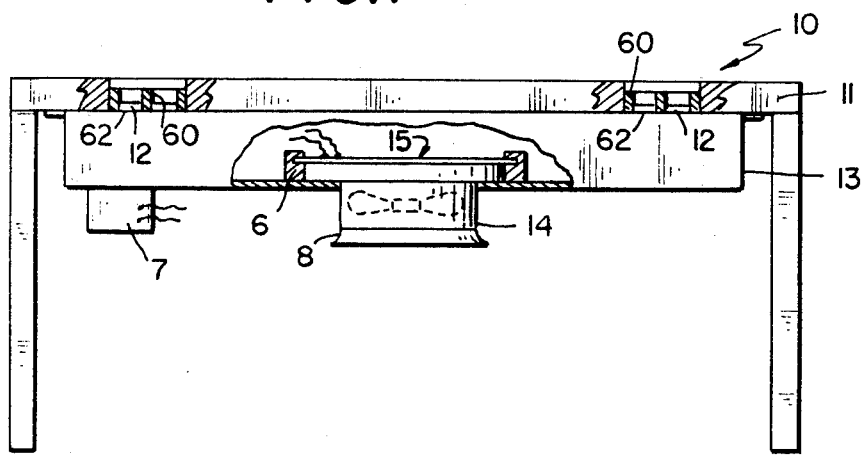
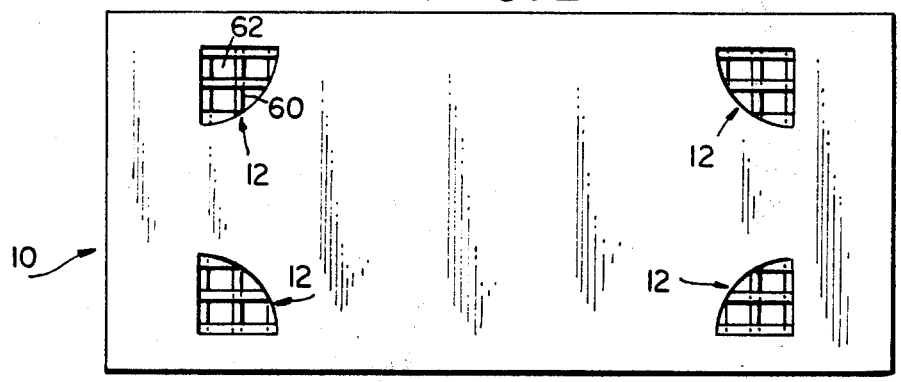
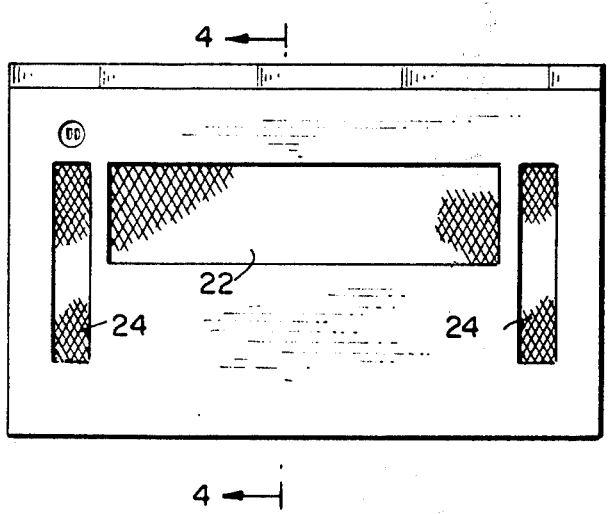
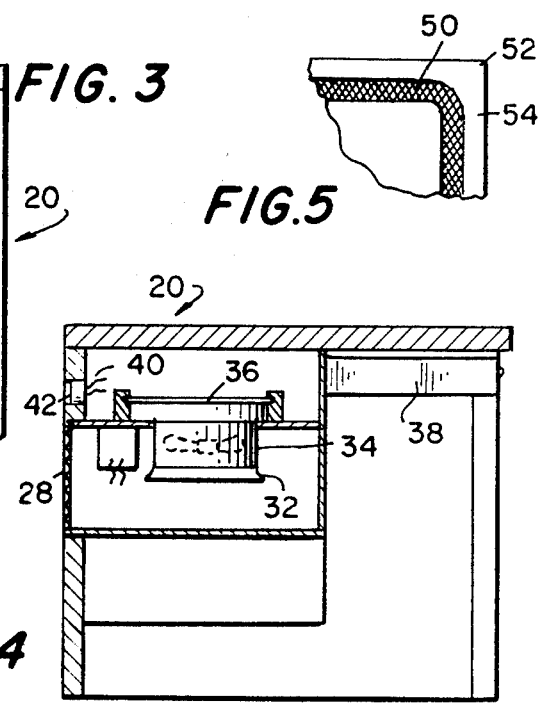

TABLE WITH ELECTROSTATIC AIR PURIFIER/CLEANER

BACKGROUND OF THE INVENTION

1. Field of the Invention

This invention relates to a table equipped with air purification means.

2. Description of the Prior Art

An indoor air cleaning device is useful in many social situations where normal air circulation cannot exchange air rapidly enough to eliminate increased concentrations of tobacco smoke odor and particulates. Electrostatic precipitators have been used in conjunction with fans in auxiliary recirculation systems to remove smoke and odors, returning the scrubbed air to the room. U.S. Pat. No. 3,421,290 is an example wherein an electrostatic precipitator is mounted in the ceiling of a bowling alley, the cleansed air being returned by a duct to a remote location in the same ceiling. A similar system has been applied to cooking ranges and ovens as described in U.S. Pat. No. 3,602,132 and its predecessors wherein precipitators are mounted above or to the side of the cooking utensils in the oven or on the range, thereby removing odors and evaporated grease close to the source and recirculating the cleansed air. An electrostatic precipitator is included in a television cabinet in U.S. Pat. No. 3,469,031 to remove smoke in the vicinity of the television set.

SUMMARY OF THE INVENTION

Electronic air cleaners are capable of removing a high percentage of airborne particulates, pollen, tobacco, smoke, grease, etc. However, prior to the present invention no such devices were designed to operate close to the source of tobacco smoke in rooms where people meet, sit, work, play, and congregate. Ashtrays are placed close to smokers, usually on work tables, conference tables or desks. The present invention locates the electrostatic precipitator and air recirculation means within the table or desk about which smokers sit, captures smoke and other pollutants close to the source and eliminates them before they have a chance to disperse widely. The recirculated cleansed air is discharged at low velocity through diffusers. The advantages of this invention is that the entry ports, grilles, are innocuous, a part of the table or horizontal work surface, and is readily installed in new or existing furniture and can support ashtrays, tumblers, chips, or like articles in a convenient manner. Structural alterations to the room and unsightly and expensive duct work are not required. The proximity of the air cleaner to the source minimizes the volume of air to be recirculated, with equipment of small size, low noise level for the required efficacy. The use of this invention prevents smoke filled rooms and uses a minimum of energy.

BRIEF DESCRIPTION OF THE DRAWING

FIG. 1 is a side elevational view of an embodiment of the invention with parts broken away and shown in section;

FIG. 2 is a top plan view of the table of FIG. 1 showing the location of the grilles on the table top;

FIG. 3 is a top plan view of a desk showing grille location;

FIG. 4 is a sectional view taken along the plane of line 4—4 in FIG. 3; and,

FIG. 5 is a partial plan view of another grille embodiment.

DETAILED DESCRIPTION OF THE INVENTION

With continuing reference to the accompanying drawing, wherein like reference numerals designate similar parts throughout the various views, reference numeral 10 generally designates a table according to the present invention which includes a table top 11, in which are placed attractively designed grilles 12, which open into a chamber or plenum 13, into which air is drawn by a fan 14 through the electrostatic precipitator filter 15. The precipitator 15 is mounted on a channel 6 which permits easy withdrawal for cleaning. The high voltage power supply 7 for the precipitator is shown mounted to the underside of the plenum though it may also be mounted inside the plenum. An air diffuser 8 returns the cleansed air to the room at low velocity. The top view of the table in FIG. 2 shows one arrangement of many possible locations of the air intake grilles 12 which are located at the corners of the table top 11.

In a desk 20, FIG. 3, where the work surface is at the front, a larger grille 22 can be located to the rear with other intake grilles 24 on each side. For the desk 20 air discharge is through the rear panel 28 (FIG. 4) via an air diffuser 32. The fan 34 and electrostatic precipitator 36 are disposed towards the rear to provide knee room and space for a drawer 38.

Thus this invention provides for the capture of smoke and particulates by the electrostatic precipitator filter 36 as air is drawn through it by the fan 34. Power for precipitator and fan is brought thereto by a conventional electric line cord 40. A convenience outlet 42 is included for the usual table lamp or desk lamp and other electrical appliances.

As shown in FIG. 1, the grille 12 includes members 60 which extend transverse of members 62 and extend higher so that ashtrays or other articles can be placed therein without blocking intake of smoke laden air.

The versions of the invention described disclose fully the concept and embodiment of the invention. Other designs and forms are readily feasible such as the peripheral grille 50 in FIG. 5 placed close to the peripheral edge 52 of table top 54.

In addition to electrostatic precipitation, odor control may be provided together with a fragrance dispenser. Climate control such as heating or cooling may be used and a disinfectant or activated carbon may be employed.

What is claimed is:

1. A table comprising a table top, said table having knee recesses so as to permit people to sit therearound to work and play, plenum chamber positioned below and connected to said table top, electrostatic precipitator means mounted in said plenum chamber, said table top having air entry grille means opening into the top surface thereof and in flow communication with said plenum chamber for capturing air containing tobacco smoke particles, fan means for directing the smoke particle laden air into said plenum chamber and through said electrostatic precipitator means and diffuser means for recirculating cleaned air at low velocity from said plenum chamber to the area in which the table is located.

2. The table according to claim 1, wherein said grille means includes recesses for receiving and supporting ashtrays to capture smoke close to its source.

3. The table according to claim 1, wherein said grille means extends about said table top adjacent the periphery thereof.

4. The table according to claim 1, wherein said grille means is located at each corner of said table top.

5. The table according to claim 1, wherein said grille means extends transverse of said table top.

6. The table according to claim 1, wherein said electrostatic precipitator means is suspended from and below said table top.

7. The table according to claim 1, wherein said grille means includes intersecting grille members, some of which have higher positioned portions so that ashtrays, tumblers, chips, and various other articles can be placed therein without closing off said grille means.

* * * * *